United States Patent
Goebert et al.

(10) Patent No.: US 7,213,667 B2
(45) Date of Patent: May 8, 2007

(54) AIR INTAKE

(75) Inventors: Barry Joseph Goebert, Beaver Dam, WI (US); Stephen Gerard Miggels, Wyckoff, NJ (US)

(73) Assignee: Deere & Company, Moline, IL (US)

( * ) Notice: Subject to any disclaimer, the term of this patent is extended or adjusted under 35 U.S.C. 154(b) by 82 days.

(21) Appl. No.: 10/978,044

(22) Filed: Oct. 29, 2004

(65) Prior Publication Data

US 2006/0108813 A1 May 25, 2006

(51) Int. Cl.
*B60K 11/00* (2006.01)
(52) U.S. Cl. ..................................... 180/68.1
(58) Field of Classification Search ............... 180/68.1, 180/68.2, 68.3; 293/115
See application file for complete search history.

(56) References Cited

U.S. PATENT DOCUMENTS

| | | | | |
|---|---|---|---|---|
| 1,573,659 A | * | 2/1926 | Thompson | 180/68.1 |
| 1,817,976 A | * | 8/1931 | Elliott | 180/68.1 |
| 1,855,038 A | * | 4/1932 | Hiram | 180/68.3 |
| 3,897,847 A | * | 8/1975 | Knutson | 180/68.1 |
| 4,081,050 A | * | 3/1978 | Hennessey et al. | 180/68.1 |
| 4,738,327 A | * | 4/1988 | Takei | 180/68.1 |
| 5,036,931 A | | 8/1991 | Iritani | 180/68.1 |
| 5,193,636 A | * | 3/1993 | Holm | 180/68.1 |
| 5,199,522 A | | 4/1993 | Martenas et al. | 180/68.3 |
| 5,215,157 A | * | 6/1993 | Teich | 180/68.4 |
| 5,490,574 A | | 2/1996 | Ishiizumi et al. | 180/68.1 |
| 6,167,976 B1 | | 1/2001 | O'Neil et al. | 180/69.2 |
| 6,202,777 B1 | | 3/2001 | Surridge | 180/68.1 |
| 6,684,616 B2 | * | 2/2004 | Hornung | 180/68.1 |
| 6,837,324 B2 | * | 1/2005 | Nagai et al. | 180/68.3 |
| 2002/0153182 A1 | * | 10/2002 | Vaillancourt et al. | 180/68.1 |

* cited by examiner

*Primary Examiner*—Lori L. Coletta

(57) ABSTRACT

An air intake for a lawn and garden tractor has an opening with a screen covering the opening. A float panel is positioned adjacent to and spaced from the outer surface of the screen. The full surface area of the screen is available to pull in air, while limiting engine noise entering the environment and minimizing ingestion of excess grass and other debris.

12 Claims, 4 Drawing Sheets

AIR INTAKE

FIELD OF THE INVENTION

The present invention relates to cooling systems for motor vehicles, and more specifically to an air intake for a lawn and garden tractor hood enclosing an engine and related cooling system.

BACKGROUND OF THE INVENTION

Conventional hoods or shrouds on small agricultural vehicles such as lawn and garden tractors or other grass or vegetation mowing machines typically enclose an engine, cooling system, and other vehicle components. Such vehicles commonly utilize liquid cooled internal combustion engines which generate heat during their operation. Liquid cooled engines employ pressurized coolant circulated through the engine to absorb heat. The heated coolant is subsequently passed through a heat exchanger such as a radiator to dissipate heat from the coolant to the atmosphere, after which the coolant is re-circulated to the engine for further cooling. As the coolant is passed through the heat exchanger, air flows through the heat exchanger to absorb heat and carry it out into the atmosphere. Air is commonly drawn or propelled through the radiator by use of a fan.

The capacity of a cooling system in such a vehicle depends on many factors including the velocity and volume of air flowing through the heat exchanger, as well as the distribution of the air flow over the available heat exchange surface of the radiator. Since these vehicles may be used in cutting grass or other vegetation, the air used to cool the radiator is frequently contaminated with dust, grass clippings and similar debris. Typically, such vehicles will include a grille or grilles having a screen to reduce debris present in the cooling air while allowing the air to pass into the area enclosed by the hood to cool the engine by interaction with the radiator.

In recent years, regulations are limiting allowable emissions from internal combustion engines of lawn and garden tractors, mowers and other agricultural and/or work vehicles. Due at least in part to these regulations, efforts have been made to increase the area of the cool air intake on the vehicle hood, and to increase the air flow through the heat exchanger. However, increasing the area of the air intake may result in more grass clippings, debris and other materials being sucked toward and/or into the air intake during machine operation. The materials may pile up in the air intake, restricting air flow, and may even ignite. There is a need for a larger cool air intake for a lawn and garden tractor, mower, and other small vehicle that will allow greater air flow without sucking up and/or ingesting grass clippings, debris and other materials that may restrict flow.

Additionally, there is a need to reduce or limit the noise emitted into the environment from engines of small lawn and garden tractors, mowing equipment and other small agricultural vehicles. Efforts to reduce noise levels include the design of quieter engines, and improvements to the hoods or shrouds intended to help contain or muffle engine noise. Larger air intakes, however, may limit these other noise reduction efforts. There is a need for a larger cool air intake for a lawn and garden tractor, mower, and other small agricultural vehicle that will help limit engine noise emitted into the environment.

SUMMARY OF THE INVENTION

The invention provides a cool air intake for a lawn and garden tractor, mower, and other small agricultural vehicle that allows greater air flow without sucking up and/or ingesting grass clippings, debris and other materials that may restrict air flow. The air intake also reduces or limits engine noise into the environment.

The invention includes a screen on the side panel of a hood housing an internal combustion engine. A float panel with a surface area of between about 25% and about 100% of the screen surface area is spaced from the outwardly facing surface of the screen sufficiently to allow air flow around the float panel and through the screen. A panel between the engine and screen provides a plenum separating cool intake air from the engine.

DESCRIPTION OF THE PREFERRED EMBODIMENT

Figure 1:
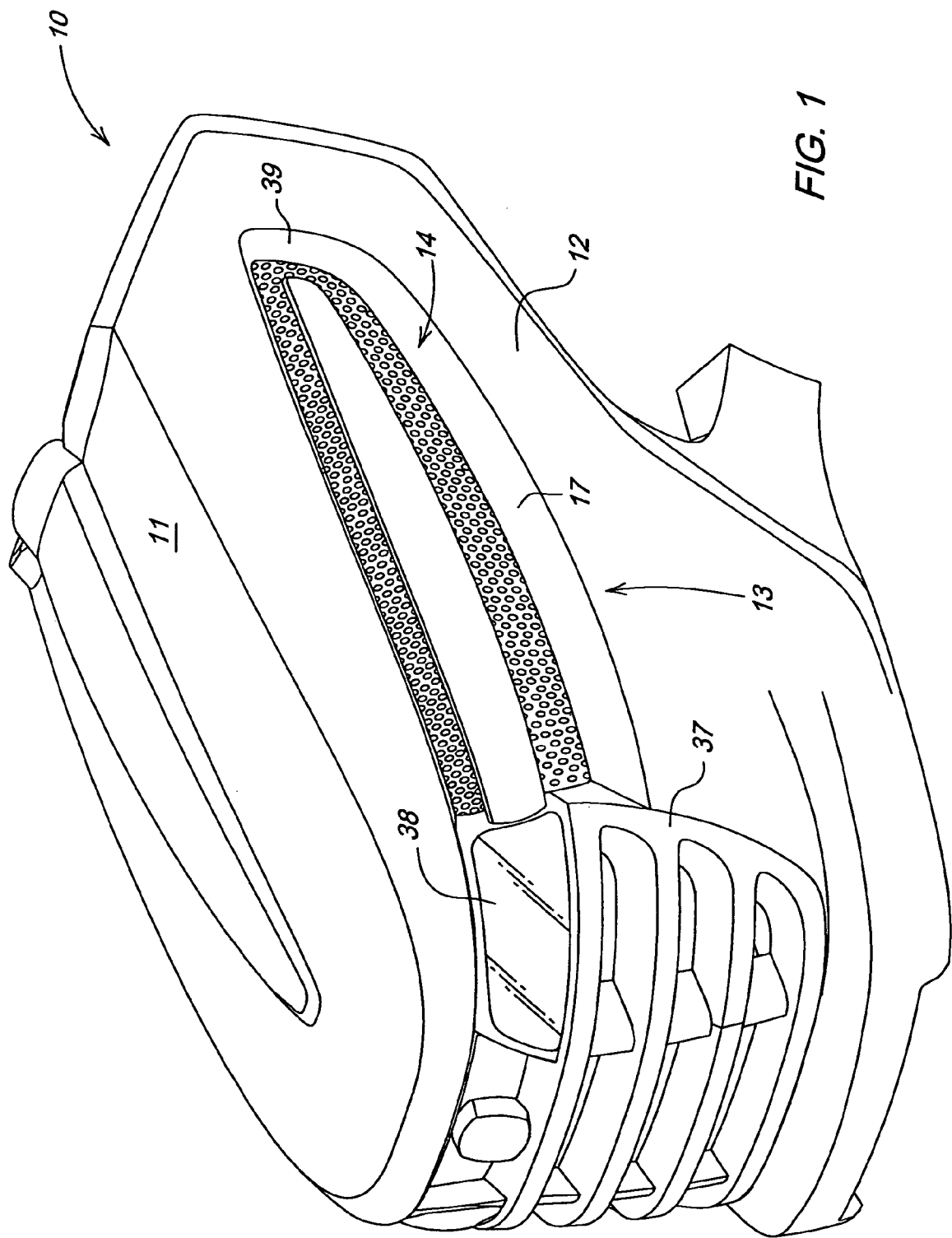
FIG. 1 is a front perspective view of a lawn and garden tractor hood having an air intake according to a first embodiment of the invention.

A first embodiment of air intake 13, shown in FIG. 1, may be in the hood of a lawn and garden tractor for mowing grass or vegetation. The air intake, however, also may be used on other types of mowing or agricultural vehicles. The lawn and garden tractor may house an internal combustion engine under hood or shroud 10. The hood may have a top panel 11 and one or more opposing side panels 12 extending downwardly from the top panel. In one embodiment, the top panel and/or left and right side panels may be tapered or sloped downwardly and inwardly toward the front of the lawn and garden tractor.

In one embodiment, each side panel may have a recess, channel or indentation 14 running longitudinally between about 25% and about 90% of the side panel length. The indentation may have a depth of between about ¼ inch and about 2 inches measured from the side panel outer surface.

Figure 2:
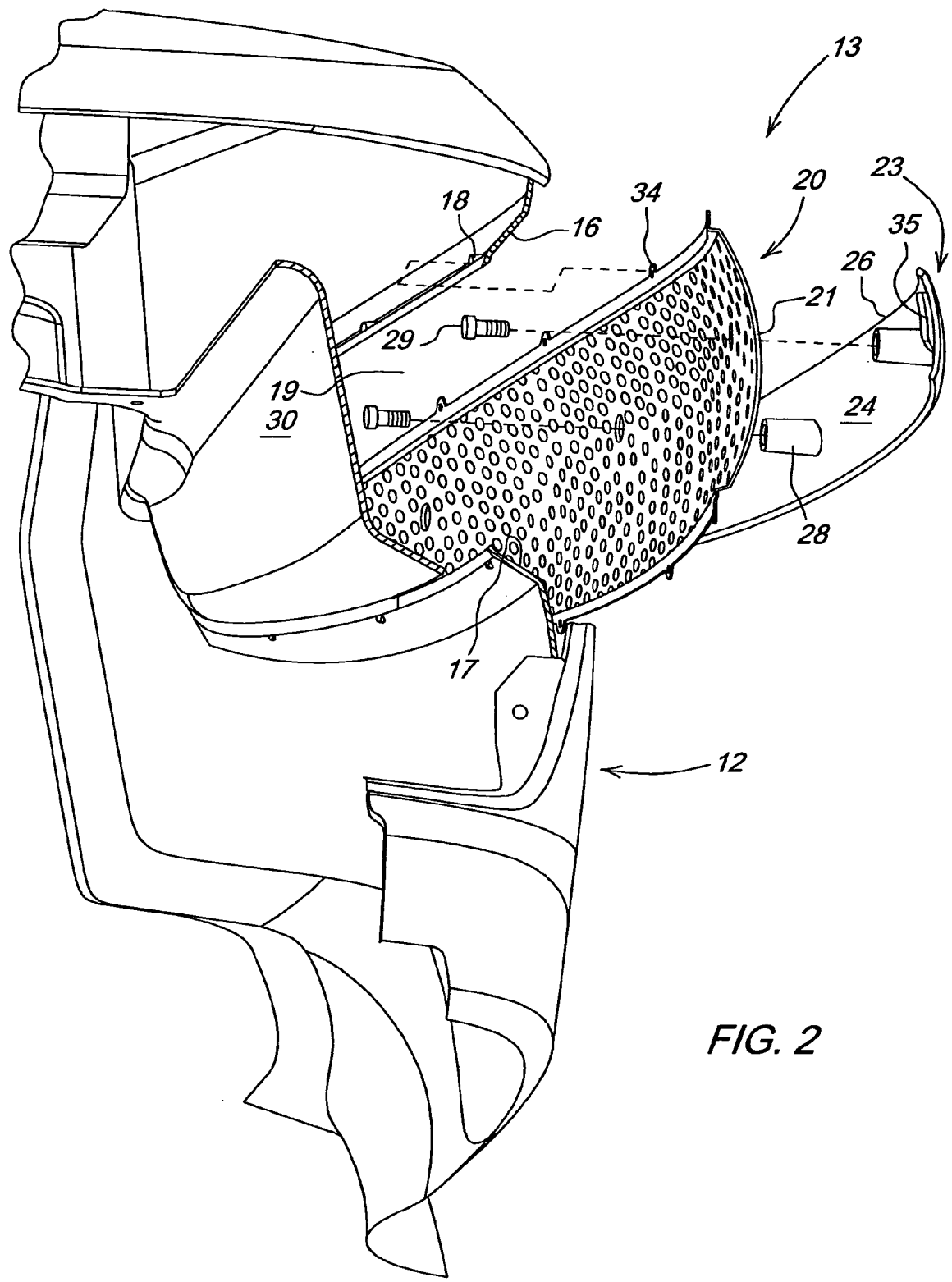
FIG. 2 is an exploded perspective view, partially in section, of the left side of tractor hood and air intake according to the first embodiment.
Figure 3:
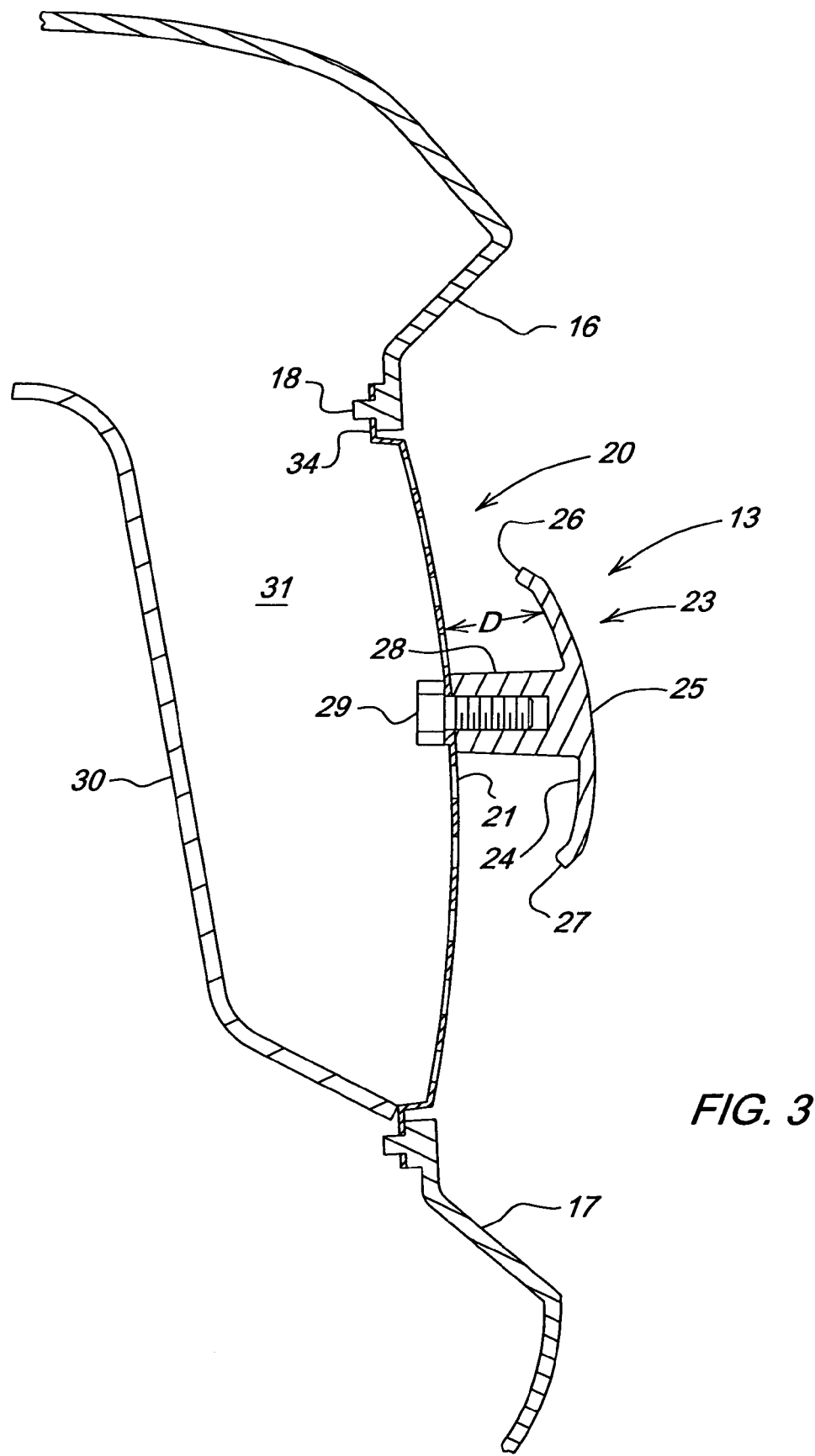
FIG. 3 is a cross section view of the air intake of FIGS. 1 and 2.

Now referring to FIGS. 2 and 3, in a first embodiment, indentation 14 in side panel 12 may have a sloped or undercut upper edge 16, lower edge 17, and front and/or rear edge 39. The edges of the indentation define the perimeter of a generally oblong opening 19. Opening 19 may have a height of between about 3 inches and about 10 inches, a length of between about 10 inches and about 60 inches, and an area of between about 100 sq. inches and about 200 sq. inches. Most preferably, opening 19 has a height of about 5 inches, a length of about 27 inches, and a surface area of about 135 sq. inches. Opening 19 may curve around at least part of the side panel 12, and may abut grille 37 and/or headlight structure 38 at the front end of the hood.

Opening 19 may be covered by screen 20. The screen may be attached to the upper, lower, and front and/or rear edges of opening 19 by tabs 34. The tabs may extend outwardly from the perimeter of screen 20, and may hook or latch to pins or posts 18 on the upper and lower edges of opening 19.

In one embodiment, the screen may be perforated metal, and about 50% open. Alternatively, the screen may be a polymer or non-metal, and/or may be mesh rather than perforated metal.

In one embodiment, screen 20 may be outwardly convex or arched in cross section. For example, at least part of central portion 21 of screen 20 may project or bulge outwardly from the perimeter of the screen. The central portion 21 may project or bulge outwardly between about 1/4 inch and about 2 inches from the perimeter of the screen. Screen 20 also may curve around side panel 12 and may abut the grille 37 and/or headlight structure 38 of the vehicle.

As shown in FIGS. 2 and 3, in one embodiment, float panel 23 may be located adjacent to and spaced outwardly from the outer surface of screen 20. For example, float panel 23 may be spaced a distance D of between about 1/4 inches and about 2 inches from the outer surface of screen 20. Float panel 23 may be generally parallel to screen 20, and may have a surface area of between about 25% and about 100% of the surface area of opening 19 and screen 20. In a first embodiment, float panel 23 has a surface area of about 50% of the surface area of the opening and screen. In general, float panel 23 may have a length of between about 50% and about 100% of the length of opening 19, and a height of between about 25% and about 100% of the height of opening 19. In the embodiment of FIGS. 2 and 3, float panel is positioned over and spaced from the central portion 21 of screen 20, without covering the perimeter of the screen.

In one embodiment, float panel 23 may have an inwardly facing surface 24, an outwardly facing surface 25, an upper edge 26, lower edge 27, and front edge 35. Float panel may have a generally uniform thickness of between about 1/32 inch and about 1/2 inch, and may be a polymer such as molded plastic, or sheet metal. Float panel 23 may have an arched or outwardly convex shape, curving around the side panel of the hood. At least part of the outwardly facing surface 25 may have graphics affixed thereon, or lettering or other material adhered thereto.

In one embodiment, spacers, pillars, or posts 28 may extend between inner surface 24 of float panel 23 and screen 20. Threaded fasteners 29 may connect to the spacers, pillars, or posts to hold and secure float panel 23 in place. Alternatively, the spacers or posts may be integral with and extend from the inner surface 24 of float panel 23, and may snap through apertures in screen 20. Various other attachment hardware may be used to fasten the float panel in spaced relationship with screen 20. For example, threaded fasteners may be used in combination with clips on or adjacent the inwardly facing surface of screen 20. Or the float panel may be secured and fastened to panel 30 which may be positioned between the hood and engine.

In one embodiment, panel 30 provides a divider or plenum 31 between screen 20 and the engine, to separate the cool intake air from the hot air generated from the engine. At least part of panel 30 may be spaced between about 1 inch and about 3 inches behind screen 20. Panel may be fastened or secured to the hood, engine or vehicle frame.

Float panel 23 may be spaced from screen 20 a distance D that is sufficient for cool air to flow around the upper, lower and/or front edges of float panel 23, and through screen 20 into plenum 31. Spacing between the float panel and the screen allows passage of sufficient cooling air even if the float panel area covers 100% of the opening.

Figure 4:
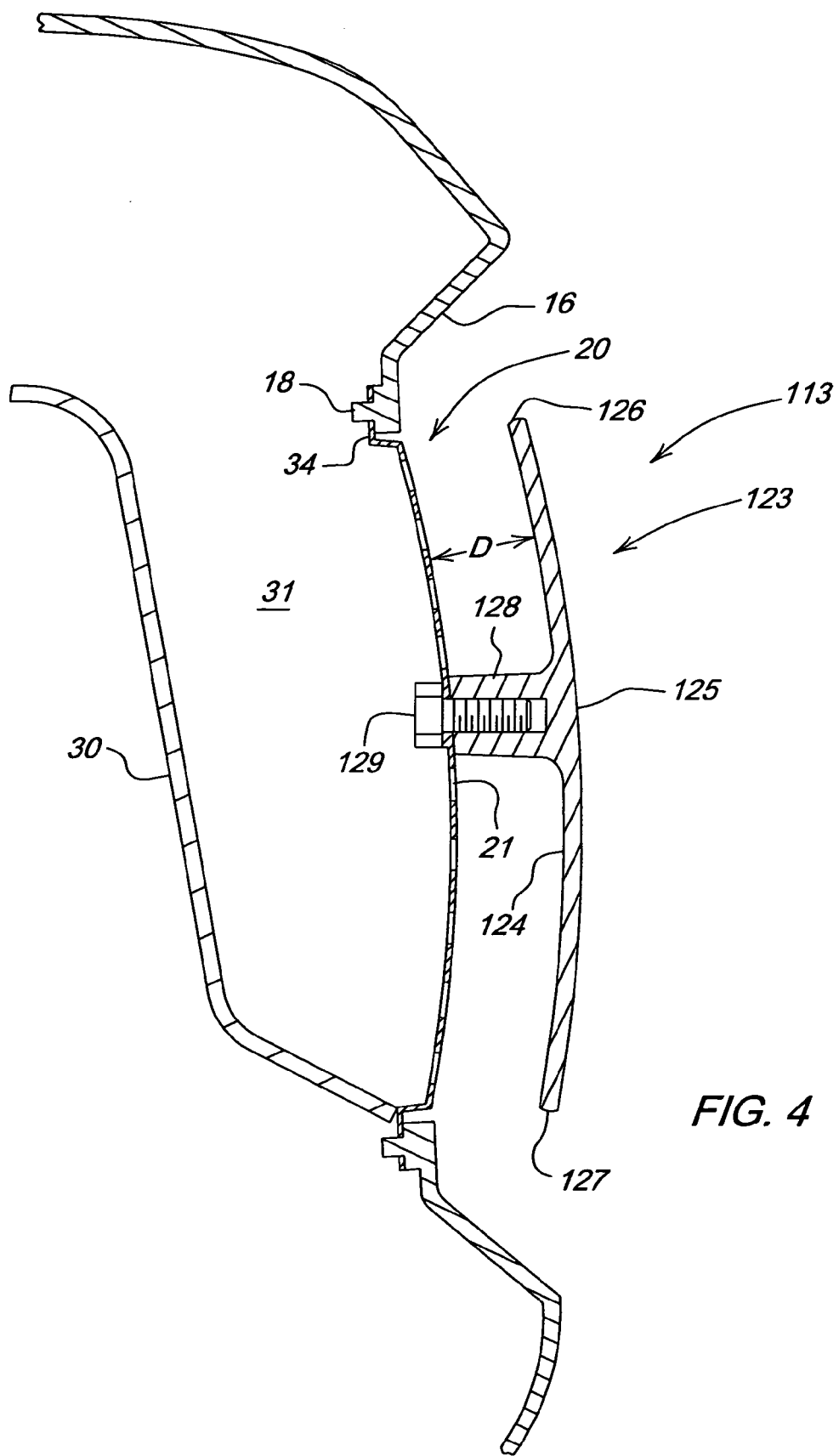
FIG. 4 is a cross section view of the air intake according to a second embodiment.

In a second embodiment shown in FIG. 4, air intake 113 includes float panel 123 that is spaced from screen 20 a distance D. Float panel 123 has a surface area of about 100% of the surface area of screen 20. Float panel 123 has an upper edge 126, a lower edge 127, an outer facing surface 125 and an inner facing surface 124. The float panel is secured to and spaced from the screen by post 128 and threaded fastener 129.

The air intake of the present invention allows the full open area of screen 20 to be available to pull in air, but provides a restriction to significantly reduce and limit engine noise entering the environment. Additionally, the air intake is maximized while the ingestion of excess grass and other debris is minimized.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. An apparatus comprising:
   a lawn and garden tractor hood having a pair of side panels and an opening in each side panel;
   a screen covering each opening, the screen having an outer surface; and a float panel positioned adjacent to and spaced from the outer surface of each screen; wherein the float panel is molded plastic and the float panel has a surface area covering at least about 25% of the surface area of the screen.

2. An apparatus comprising:
   a lawn and garden tractor hood having a pair of side panels and an opening in each side panel;
   a screen covering each opening, the screen having an outer surface; and a float panel positioned adjacent to and spaced from the outer surface of each screen; wherein the float panel is molded plastic; and a panel between the screen and an internal combustion engine.

3. An apparatus comprising:
   a screen covering an air intake on the side of a mowing vehicle hood covering an internal combustion engine;
   a float panel having a surface area covering at least about 25% of the screen area, the float panel being spaced from the screen sufficiently for air to flow around the float panel and through the screen; and
   a panel between the engine and the screen;
   wherein the side of the mowing vehicle hood is tapered toward the front end of the vehicle.

4. An apparatus comprising:
   a screen covering an air intake on the side of a mowing vehicle hood covering an internal combustion engine;
   a float panel having a surface area covering at least about 25% of the screen area, the float panel being spaced from the screen sufficiently for air to flow around the float panel and through the screen; and a panel between the engine and the screen;

wherein the screen has a central portion and a perimeter, the float panel positioned over and spaced from the central portion without covering the perimeter.

5. The apparatus of claim 4 further comprising a plurality of threaded fasteners connecting the float panel to the screen.

6. An apparatus comprising:

a screen covering an air intake on the side of a mowing vehicle hood covering an internal combustion engine;

a float panel having a surface area covering at least about 25% of the screen area, the float panel being spaced from the screen sufficiently for air to flow around the float panel and through the screen; and a panel between the engine and the screen;

wherein the screen and the float panel each have outwardly convex surfaces.

7. The apparatus of claim 6 wherein the screen is perforated metal.

8. A hood side panel of a mowing vehicle, comprising:

an indentation extending between about 25% and about 90% of the length of the side panel;

an opening in the indentation;

a screen covering the opening; the screen having an outward facing surface and an inward facing surface; and a float panel secured to the outward facing surface of the screen and positioned over between about 25% and about 100% of the screen surface area and being spaced sufficiently from the screen to allow air flow around the float panel and through the screen.

9. The hood side panel of claim 8 wherein the screen has a central portion and a perimeter, the float panel positioned over the central portion without covering the perimeter.

10. The hood side panel of claim 8 further comprising a plurality of spacers fastening the float panel to the screen.

11. The hood side panel of claim 8 further comprising a plenum on the inward facing surface of the screen.

12. The hood side panel of claim 8 wherein the screen is attached to an upper edge and a lower edge of the opening.

* * * * *